(12) United States Patent
Gold et al.

(10) Patent No.: US 9,009,724 B2
(45) Date of Patent: Apr. 14, 2015

(54) LOAD BALANCING DATA ACCESS IN VIRTUALIZED STORAGE NODES

(75) Inventors: Stephen Gold, Fort Collins, CO (US); Jeffrey DiCorpo, San Carlos, CA (US); Simon Pelly, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 12/889,727

(22) Filed: Sep. 24, 2010

(65) Prior Publication Data

US 2012/0079499 A1 Mar. 29, 2012

(51) Int. Cl.
*G06F 9/46* (2006.01)
*G06F 9/455* (2006.01)
*G06F 3/06* (2006.01)
*H04L 29/08* (2006.01)

(52) U.S. Cl.
CPC ............ *G06F 3/0635* (2013.01); *G06F 3/0607* (2013.01); *G06F 3/0611* (2013.01); *G06F 3/0664* (2013.01); *G06F 3/067* (2013.01); *H04L 67/1097* (2013.01); *H04L 67/1008* (2013.01)

(58) Field of Classification Search
CPC . G06F 3/0635; G06F 3/0607; G06F 3/00611; G06F 3/0664; G06F 3/067
See application file for complete search history.

(56) References Cited

U.S. PATENT DOCUMENTS

| | | | |
|---|---|---|---|
| 5,119,368 A | 6/1992 | Hiltner et al. | |
| 5,475,834 A | 12/1995 | Anglin et al. | |
| 5,600,653 A | 2/1997 | Chitre et al. | |
| 5,805,864 A * | 9/1998 | Carlson et al. | 703/24 |
| 5,854,754 A | 12/1998 | Cabrera et al. | |
| 6,519,333 B1 * | 2/2003 | Malik | 379/207.02 |
| 6,601,187 B1 | 7/2003 | Sicola et al. | |
| 6,636,778 B2 | 10/2003 | Basham et al. | |
| 6,785,786 B1 | 8/2004 | Gold et al. | |
| 6,842,841 B1 | 1/2005 | Kuik et al. | |
| 6,883,083 B1 * | 4/2005 | Kemkar | 711/203 |
| 6,888,792 B2 * | 5/2005 | Gronke | 370/227 |
| 6,947,981 B2 | 9/2005 | Lubbers et al. | |
| 7,089,281 B1 * | 8/2006 | Kazemi et al. | 709/203 |
| 7,146,476 B2 | 12/2006 | Sandorfil et al. | |
| 7,149,858 B1 | 12/2006 | Kiselev | |

(Continued)

FOREIGN PATENT DOCUMENTS

EP 0899662 3/1999
JP 3265974 3/2002

OTHER PUBLICATIONS

"VTL and PureDisk" available from http://sun.symantec.com/files/4/VTL%20and%20PureDisk_7-31_0_0.pdf, available on the Internet at least as early as Sep. 24, 2010.

(Continued)

*Primary Examiner* — Meng An
*Assistant Examiner* — Wissam Rashid
(74) *Attorney, Agent, or Firm* — Trenner Law Firm, LLC

(57) ABSTRACT

Systems and methods of load balancing data access in virtualized storage nodes are disclosed. An embodiment of a method includes receiving a data access request from a client for data on a plurality of the virtualized storage nodes. The method also includes connecting the client to one of the plurality of virtualized storage nodes having data for the data access request. The method also includes reconnecting the client to another one of the plurality of virtualized storage nodes to continue accessing data in the data access request.

20 Claims, 3 Drawing Sheets

(56) References Cited

U.S. PATENT DOCUMENTS

| | | | |
|---|---|---|---|
| 7,383,407 | B1 | 6/2008 | Kiselev |
| 7,457,833 | B2 | 11/2008 | Bear et al. |
| 7,487,328 | B2 | 2/2009 | Sakaki et al. |
| 7,506,011 | B2 | 3/2009 | Liu et al. |
| 7,536,424 | B2 | 5/2009 | Barzilai et al. |
| 7,552,358 | B1 | 6/2009 | Asgar-Deen et al. |
| 7,567,188 | B1 | 7/2009 | Anglin et al. |
| 7,613,945 | B2 | 11/2009 | Soran et al. |
| 7,689,759 | B2 | 3/2010 | Bello et al. |
| 7,756,833 | B2 | 7/2010 | Van Ingen et al. |
| 7,761,425 | B1* | 7/2010 | Erickson et al. ............... 707/649 |
| 7,941,619 | B1 | 5/2011 | Rossi |
| 8,055,622 | B1 | 11/2011 | Botes et al. |
| 2004/0139240 | A1* | 7/2004 | DiCorpo et al. .................. 710/3 |
| 2005/0010677 | A1 | 1/2005 | Krissell |
| 2005/0050055 | A1 | 3/2005 | Chang et al. |
| 2005/0081096 | A1 | 4/2005 | Gold et al. |
| 2005/0262168 | A1 | 11/2005 | Helliker et al. |
| 2006/0010174 | A1 | 1/2006 | Nguyen et al. |
| 2006/0123189 | A1 | 6/2006 | Bitner et al. |
| 2006/0224852 | A1 | 10/2006 | Kottomtharayil et al. |
| 2007/0266062 | A1 | 11/2007 | Young |
| 2007/0283017 | A1 | 12/2007 | Anand et al. |
| 2007/0294206 | A1 | 12/2007 | Korman et al. |
| 2008/0162843 | A1 | 7/2008 | Davis et al. |
| 2008/0263551 | A1 | 10/2008 | Ali et al. |
| 2009/0276203 | A1 | 11/2009 | Everhart |
| 2009/0282203 | A1 | 11/2009 | Haustein et al. |
| 2009/0292715 | A1 | 11/2009 | Chiaramonte et al. |
| 2009/0300633 | A1 | 12/2009 | Altrichter et al. |
| 2010/0010799 | A1 | 1/2010 | Altrichter et al. |
| 2010/0070475 | A1 | 3/2010 | Chen |
| 2010/0217612 | A1 | 8/2010 | Apacible et al. |
| 2010/0247094 | A1 | 9/2010 | Young |
| 2010/0280651 | A1* | 11/2010 | Edling et al. .................. 700/214 |
| 2011/0016088 | A1 | 1/2011 | Spackman |
| 2011/0231172 | A1 | 9/2011 | Gold |
| 2011/0246735 | A1 | 10/2011 | Bryant et al. |
| 2012/0078846 | A1 | 3/2012 | Gold et al. |
| 2012/0095968 | A1 | 4/2012 | Gold |

OTHER PUBLICATIONS

Davies, Alex, "NetBackup Disk Based Data Protection Options", Symantec White Paper, available from http://eval.symantec.com/mktginfo/enterprise/white_papers/b-whitepaper_nbu_disk_based_data_protection_options_4_2_008.pdf, copyright 2007.

"HP StorageWorks Virtual Library System Solutions Guide," 2007, Hewlett-Packard Development Company, pp. 1-46.

"HP Data Protector Software Advanced Backup to Disk Integration with Virtual Tape Libraries," 2008, Hewlett-Packard Development Company, pp. 1-23.

William Stallings, "Operating Systems: internals and design principles," third edition, 1998, Prentice-Hall Inc., pp. 380-383.

"HP StorageWorks—Deduplication and replication solutions guide," Fourth edition, Apr. 2009, pp. 1-138.

JP3265974—Machine Translation from JP PTO Website—Earliest Publication date appears to be 1990.

U.S. Appl. No. 12/728,249, Notice of Allowance dated Dec. 15, 2014 (9 pages).

* cited by examiner

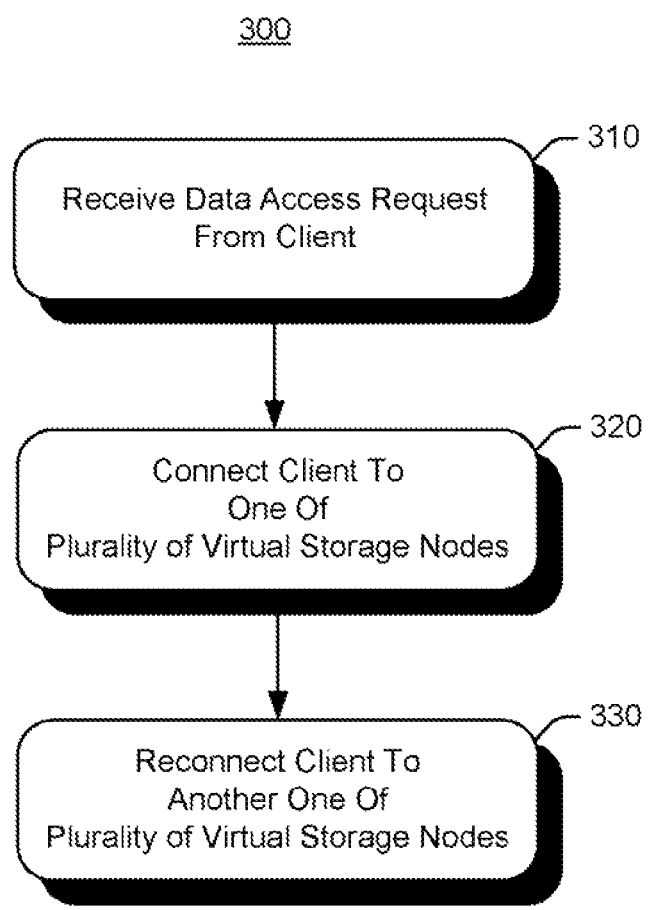

LOAD BALANCING DATA ACCESS IN VIRTUALIZED STORAGE NODES

BACKGROUND

Storage devices commonly implement data backup operations (e.g., conventional backup, deduplication) using virtual storage products for data recovery. Some virtual storage products have multiple backend storage devices that are virtualized so that the storage appears to a client as a discrete storage devices, while the backup operations may store data across one or more of the physical storage devices. When the client reads and/or writes (or "accesses") data from a virtual storage device (e.g., during backup and/or restore operations), that data may need to be accessed across more than one of the physical storage devices. In order to move data from one physical storage product to another, the virtual storage product may include backend connections to all of the physical storage devices, e.g., an inter-device local area network (LAN).

Communications that are facilitated over the inter-device LAN are slower than direct connections, and may unacceptably degrade performance. In addition, scaling the virtual storage product is limited by the inter-device LAN. That is, additional physical storage devices can only be added to the extent those devices are supported by the existing infrastructure (e.g., the inter-device LAN) without complex and costly upgrades.

BRIEF DESCRIPTION OF THE DRAWINGS

FIG. 3 is a flow diagram illustrating operations which may be implemented for load balancing data access in virtualized storage nodes.

DETAILED DESCRIPTION

Figure 1:
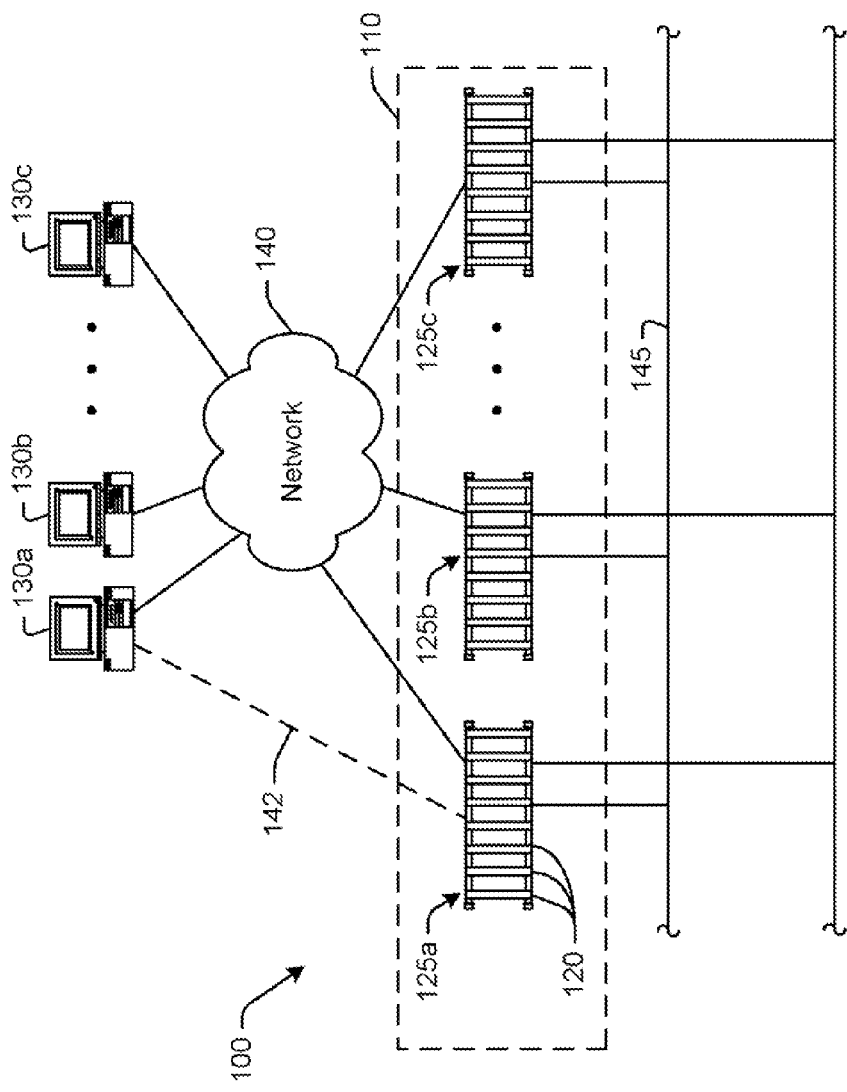
FIG. 1 is a high-level diagram showing an example of a storage system including a plurality of virtualized storage nodes.

Systems and methods are disclosed for load balancing data access in virtualized storage nodes, e.g., during backup and restore operations for an enterprise. It is noted that the term "backup" is used herein to refer to backup operations including echo-copy and other proprietary and non-proprietary data operations now known or later developed. Briefly, a storage system is disclosed including a plurality of physical storage nodes. The physical storage nodes are virtualized as one or more virtual storage devices (e.g., a virtual storage library having virtual data cartridges that can be accessed by virtual storage drives). Data may be backed-up to a virtual storage device presented to the client as having discrete storage devices (e.g., data cartridges). However, the data for a discrete storage device may actually be stored on any one or more of the physical storage devices.

To provide optimal data access performance, a virtual drive should be connected on the same node as the virtual cartridge loaded into the virtual drive to avoid the virtual drive having to communicate over the back-end network (e.g., the inter-device LAN).

The systems and methods described herein enable a client to access data stored across more than one of the virtualized storage nodes, while reducing or altogether eliminating traffic over the backend network. During operation, the virtual cartridge is presented to the client as being loaded in a single stationary virtual drive. However, the virtual drive is dynamically "moved" from one virtualized storage node to another virtualized storage node by connecting and reconnecting the client to the different nodes to access all of the data residing on different virtualized storage nodes. Moving the virtual drive is transparent to the backup application.

In an embodiment, an interface is provided between the virtualized storage nodes and the client. The interface is configured to receive data access requests from the client for data on a virtual device, but which may reside on more than one of the plurality of the virtualized storage nodes. A connection manager is operatively associated with the interface. The connection manager is configured to connect the client to one of the plurality of virtualized storage nodes, and then seamlessly reconnect the client to another one of the plurality of virtualized storage nodes to provide access to data in the data access request.

Accordingly, the systems and methods described herein enable data access from a plurality of different physical nodes without performance degradation caused by the backend network. The systems and methods also enable scaling of the virtual storage product, because the number of physical storage devices is not dependent on the physical limitations of the backend network. While there is almost no limit on how many physical storage nodes can be used for a single virtual library, it is noted that in an embodiment utilizing World Wide Port Names (WWPNs), there is a limit to the number of virtual WWPNs that can be implemented through the use of N-Port ID Virtualization (an industry standard within storage networking (NPIV)) on a given physical port, typically 255.

The systems and methods may also be implemented in a node failover scheme, where moving the virtual drive to different nodes to access data may be used when a node fails. As well as optimizing the internal traffic, this embodiment can also optimize the front-end network to ensure the front-end load is evenly balanced across the available nodes (thus fully utilizing all available bandwidth).

FIG. 1 is a high-level diagram showing an example of a storage system 100. Storage system 100 may include a storage device 110 with one or more storage nodes 120. The storage nodes 120, although discrete (i.e., physically distinct from one another), may be logically grouped into one or more virtual devices 125a-c (e.g., a virtual library including one or more virtual cartridges accessible via one or more virtual drives).

For purposes of illustration, each virtual cartridge may be held in a "storage pool," where the storage pool may be a collection of disk array LUNs. There can be one or multiple storage pools in a single storage product, and the virtual cartridges in those storage pools can be loaded into any virtual drive. A storage pool may also be shared across multiple storage systems.

The virtual devices 125a-c may be accessed by one or more client computing device 130a-c (also referred to as "clients"), e.g., in an enterprise. In an embodiment, the clients 130a-c may be connected to storage system 100 via a "front-end" communications network 140 and/or direct connection (illustrated by dashed line 142). The communications network 140 may include one or more local area network (LAN) and/or wide area network (WAN) and/or storage area network (SAN). The storage system 100 may present virtual devices 125a-c to clients via a user application (e.g., in a "backup" application).

The terms "client computing device" and "client" as used herein refer to a computing device through which one or more users may access the storage system 100. The computing devices may include any of a wide variety of computing systems, such as stand-alone personal desktop or laptop computers (PC), workstations, personal digital assistants (PDAs), mobile devices, server computers, or appliances, to name only a few examples. Each of the computing devices may include memory, storage, and a degree of data processing capability at least sufficient to manage a connection to the storage system 100 via network 140 and/or direct connection 142.

In an embodiment, the data is stored on more than one virtual device 125, e.g., to safeguard against the failure of any particular node(s) 120 in the storage system 100. Each virtual device 125 may include a logical grouping of storage nodes 120. Although the storage nodes 120 may reside at different physical locations within the storage system 100 (e.g., on one or more storage device), each virtual device 125 appears to the client(s) 130a-c as individual storage devices. When a client 130a-c accesses the virtual device 125 (e.g., for a read/write operation), an interface coordinates transactions between the client 130a-c and the storage nodes 120.

The storage nodes 120 may be communicatively coupled to one another via a "back-end" network 145, such as an inter-device LAN. The storage nodes 120 may be physically located in close proximity to one another. Alternatively, at least a portion of the storage nodes 120 may be "off-site" or physically remote from the local storage device 110, e.g., to provide a degree of data protection.

The storage system 100 may be utilized with any of a wide variety of redundancy and recovery schemes for replicating data stored from the clients 130. Although not required, in an embodiment, deduplication may be implemented for replication. Deduplication has become popular because as data growth soars, the cost of storing data also increases, especially backup data on disk. Deduplication reduces the cost of storing multiple backups on disk. Because virtual tape libraries are disk-based backup devices with a virtual file system and the backup process itself tends to have a great deal of repetitive data, virtual cartridge libraries lend themselves particularly well to data deduplication. In storage technology, deduplication generally refers to the reduction of redundant data. In the deduplication process, duplicate data is deleted, leaving only one copy of the data to be stored. Accordingly, deduplication may be used to reduce the required storage capacity because only unique data is stored. That is, where a data file is conventionally backed up X number of times, X instances of the data file are saved, multiplying the total storage space required by X times. In deduplication, however, the data file is only stored once, and each subsequent time the data file is simply referenced back to the originally saved copy.

With a virtual cartridge device that provides storage for deduplication, the net effect is that, over time, a given amount of disk storage capacity can hold more data than is actually sent to it. For purposes of example, a system containing 1 TB of backup data which equates to 500 GB of storage with 2:1 data compression for the first normal full backup. If 10% of the files change between backups, then a normal incremental backup would send about 10% of the size of the full backup or about 100 GB to the backup device. However, only 10% of the data actually changed in those files which equates to a 1% change in the data at a block or byte level. This means only 10 GB of block level changes or 5 GB of data stored with deduplication and 2:1 compression. Over time, the effect multiplies. When the next full backup is stored, it will not be 500 GB, the deduplicated equivalent is only 25 GB because the only block-level data changes over the week have been five times 5 GB incremental backups. A deduplication-enabled backup system provides the ability to restore from further back in time without having to go to physical tape for the data.

Regardless of whether deduplication is used, data management and handling may be enhanced by load balancing data access in virtualized storage nodes. With multiple nodes (with non-shared back-end storage) each node has its own local storage. A virtual library spanning multiple nodes means that each node contains a subset of the virtual cartridges in that library (for example each node's local file system segment contains a subset of the files in the global file system. Each file represents a virtual cartridge stored in a local file system segment which is integrated with a deduplication store. Pieces of the virtual cartridge are contained in different deduplication stores based on references to other duplicate data in other virtual cartridges.

With a virtual cartridge library emulation presented from the front-end ports of the nodes, the virtual drives are assigned to specific LUNs on specific front-end ports. Any backup application using that virtual library can load any virtual cartridge into any virtual drive, basically resulting in random virtual cartridges being loaded into random virtual drives (e.g., based on drive availability and media usage/retention and/or other policies). This means that the virtual cartridge selected by the backup application to be loaded into a virtual drive may not be a virtual cartridge on the local file system segment, and data access traffic has to be transferred from one node to another over the backend network.

Due to the random nature of which virtual cartridge is loaded into which virtual drive, and what data is stored on which node, the system needs to be able to move individual virtual drives from one node to another to reduce or altogether eliminate traffic on the backend network. Such systems and methods for load balancing data access in virtualized storage nodes may be better understood by the following discussion and with reference to FIGS. 2 and 3.

Figure 2:
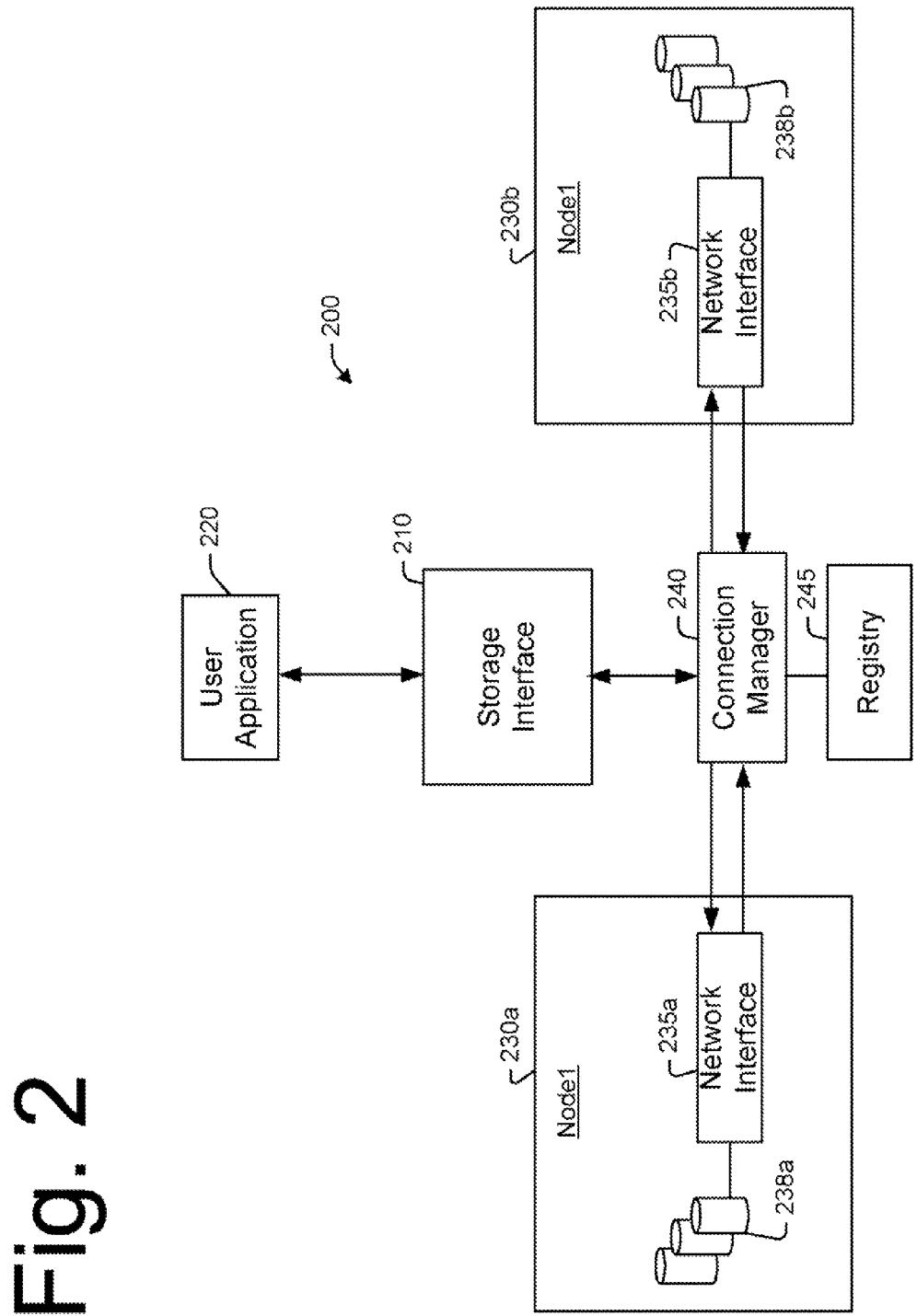
FIG. 2 illustrates an example of software architecture which may be implemented in the storage system for load balancing data access in virtualized storage nodes.

FIG. 2 shows an example of software architecture 200 which may be implemented in the storage system (e.g., storage system 100 shown in FIG. 1) for load balancing data access in virtualized storage nodes. It is noted that the components shown in FIG. 2 are provided only for purposes of illustration and are not intended to be limiting. For example, although only two virtualized storage nodes (Node0 and Node1) are shown in FIG. 2 for purposes of illustration, there is no practical limit on the number of virtualized storage nodes which may be utilized.

It is also noted that the components shown and described with respect to FIG. 2 may be implemented in program code (e.g., firmware and/or software and/or other logic instructions) stored on one or more computer readable medium and executable by a processor to perform the operations described below. The components are merely examples of various functionality that may be provided, and are not intended to be limiting.

In an embodiment, the software architecture 200 may comprise a storage interface 210 operatively associated with a user application 220 (such as a backup application) executing on or in association with the client. The storage interface 210 is configured to receive data access requests from the client (e.g., via user application 220) for data on the virtualized storage nodes 230a-b. A connection manager 240 is operatively associated with the storage interface 210. The connection manager 240 is configured to connect the client to one of the virtualized storage nodes 230a (e.g., via network interface 235a), and then reconnect the client to another one of the virtualized storage nodes 230b (e.g., via network interface 235b) to provide access to data stored on physical storage 238a-b across the plurality of virtualized storage nodes 230a-b.

During operation, the connection manager 210 may establish the connection/reconnection with the client by dynamically moving a virtual drive from one node 230a to another node 230b depending on which virtual cartridge is loaded into the virtual drive, and with deduplication, also depending on the data written to the virtual cartridge. The connection mechanism ensures that the virtual drive is always presenting on the same node as the physical copy of that virtual cartridge (or portion of the virtual cartridge). Thus, the connection mechanism avoids having to transfer data access traffic from node-to-node over the backend network.

For purposes of illustration, in a simple non-deduplication example, the entire contents of a virtual cartridge may be considered to be a single file held physically in a single node file system segment. In this example, when a virtual cartridge is loaded into a virtual drive, the connection manager 240 locates the physical node containing that virtual cartridge (e.g., by accessing registry 245), and then moves the virtual drive to that node so that all data access traffic is local to that node.

In a deduplication example, however, each backup job (or portion of a backup job) stored on the virtual tape may be held in a different deduplication store, with each store in a different node (e.g., 230a and 230b). In this example, in order to access data, the connection manager 240 locates the deduplication storage containing that section of the virtual cartridge which then indicates which node to move the virtual drive to. Since different sections of the virtual cartridge may be in different deduplication stores, the virtual drive may need to move to different nodes as the read progresses through the virtual cartridge.

In order to write data (e.g., as part of a backup job), the connection manager 240 cannot locate the appropriate deduplication store (and thus the appropriate node) until data starts writing. At this point, the multi-node deduplication "bus" can direct the new data to the deduplication store that has the highest chance of already having duplicate data that matches the new data based on the initial hash signatures of the data. But because this requires some portion of the data to have been written before the virtual drive can be moved to the correct node, there is an initial portion of data written to the "wrong" node that would need to be moved to the correct node when the virtual drive is moved. This is typically a small amount of data (e.g., 10 MBytes) which can readily be transferred over the inter-device LAN without incurring negative performance issues.

To actually move the virtual drive such that the backup application 220 is unaware of the move (i.e., so that the move is transparent to the client), in an embodiment, each virtual drive may use NPIV to present each virtual device (e.g., drive) as a unique fiber channel (FC) WWPN. In other words, each virtual device is presented as a virtual FC port with a virtual identity that is different from the physical FC port. If each virtual drive is its own virtual FC port, then the presentation of one physical port can be disabled, while enabling that same presentation from a different physical port on a different node.

In order to achieve the substantially simultaneous transfer from one physical port to another (e.g., network interface 235a to network interface 235b), low-level small computer system interface (SCSI) emulation may be implemented in an embodiment, to "pause" an active tape command (e.g., WRITE or READ or WRITE FILEMARK or LOAD) when it needs to move the virtual drive to another node. For example, the storage interface 210 may delay sending a completion status back to the backup application 220, while still responding to REQ/ACK requests from the client to indicate that there has not been an error (which may otherwise cause the backup application to terminate the data access operations). Standard FC and SCSI and backup applications 220 handle small time delays without terminating.

While the current command is paused, the state of the virtual drive is transferred to the new node (e.g., 230b), including information such as the virtual drive information, virtual drive virtual WWPN, block location in the cartridge, etc. The connection manager 240 then creates the virtual drive at the new node 230b based on this information. It is noted that there should not be any point at which the same WWPN is presented simultaneously on two nodes. A connected fabric would likely recognize this and disable its port associated with the later instance.

Once the new virtual drive is prepared and ready to present on the new node 230b, the original node 230a completes the outstanding SCSI command (e.g., return status), and disables the original presentation of the virtual drive. The virtual drive is then presented to the client on the new node 230b. If after the virtual drive move is completed, there is some data written to the wrong node, then this data may be queued up and migrated to the new node, e.g., via the backend network.

It is noted that the transfer from one physical port to another described above makes use of lower level SCSI emulation to pause WRITE and READ commands during the transition. In another embodiment, however, Fiber Channel Protocol (FCP) mechanisms for sequence level error recovery at the FC level may be utilized to move the WWPN, and retry and complete outstanding commands on the new node 230b.

It is also noted that when moving between two different ports (e.g., network interface 235a and 235b), at no time should the destination node be enabled (FC LOGIN with FDISC) before the source node 230a is disabled (FC LOGOUT with LOGO). That is, there may need to be a time between these two transactions for the fabric to be made aware of the change in case the two ports are in the same fabric, but on separate switches. In addition, the second transaction (destination node FC FDISC) needs to complete once a Registered State Change Notification (RSCN) has been received by the destination or target node 230b from the source node 230a or after a suitable timeout. The move can happen during one or more SCSI exchange and there is the expectation that the host is able to perform FC Exchange Level retries to the destination node 230b. In another embodiment, when there are no SCSI exchanges in process for each host in the target node login table, the target node 230b may "force" a disconnection with the host using a LOGOUT (FC LOGO). Once all hosts have been LOGOUT, then a node move may be started.

As alternative to this embodiment to transfer the virtual tape drive from one node to another, the virtual device may be "killed" on the old node and then a "dummy" virtual device is quickly created on the new node. The "dummy" device reports "busy" until the rest of the transfer is complete. This embodiment may be used for the node failover, because when a node fails the "dead" node cannot be made "busy."

Before continuing, it is noted that although implemented as program code, the components described above with respect to FIG. 2 may be operatively associated with various hardware components for establishing and maintaining a communications links, and for communicating the data between the storage device and the client.

It is also noted that the software link between components may also be integrated with replication and deduplication technologies. In use, the user can setup replication and run replication jobs in a user application (e.g., the "backup" application) to replicate data in a virtual cartridge. While the term "backup" application is used herein, any application that supports replication operations may be implemented.

Although not limited to any particular usage environment, the ability to better schedule and manage backup "jobs" is particularly desirable in a service environment where a single virtual storage product may be shared by multiple users (e.g., different business entities), and each user can determine whether to add a backup job to the user's own virtual cartridge library within the virtual storage product.

In addition, any of a wide variety of storage products may also benefit from the teachings described herein, e.g., files sharing in network-attached storage (NAS) or other backup devices. In addition, the remote virtual library (or more generally, "target") may be physically remote (e.g., in another room, another, building, offsite, etc.) or simply "remote" relative to the local virtual library.

Variations to the specific implementations described herein may be based on any of a variety of different factors, such as, but not limited to, storage limitations, corporate policies, or as otherwise determined by the user or recommended by a manufacturer or service provider.

FIG. 3 is a flow diagram 300 illustrating operations which may be implemented for load balancing data access in virtualized storage nodes. Operations described herein may be embodied as logic instructions on one or more computer-readable medium. When executed by one or more processor, the logic instructions cause a general purpose computing device to be programmed as a special-purpose machine that implements the described operations.

In operation 310, a data access request is received from a client for data on a plurality of the virtualized storage nodes. In operation 320, the client is connected to one of the plurality of virtualized storage nodes having data for the data access request. In operation 330, the client is reconnected to another one of the plurality of virtualized storage nodes to continue accessing data in the data access request.

Other operations (not shown in FIG. 3) may also be implemented in other embodiments. Further operations may include, for example, operations may also include signaling the client that the connection to one of the plurality of virtualized storage nodes is busy while reconnecting the client to another one of the plurality of virtualized storage nodes. Operations may also include interrupting a connection with the client within a timeout window of the data access application. Interrupting the connection with the client may be transparent to the client. In other operations, the connection with the client is restored before the data access application registers an error in data access operations.

Accordingly, the operations reduce backend network traffic between the plurality of virtualized storage nodes. The operations also balance bandwidth for the plurality of virtualized storage nodes.

It is noted that the embodiments shown and described are provided for purposes of illustration and are not intended to be limiting. Still other embodiments are also contemplated for load balancing data access in virtualized storage nodes.

The invention claimed is:

1. A method of load balancing data access in virtualized storage nodes, comprising:
   receiving a data access request from a client for data on a plurality of the virtualized storage nodes;
   connecting the client to one of the plurality of virtualized storage nodes by moving a virtual drive to one of a plurality of virtualized storage nodes that contain a virtual cartridge having portions of the data for the data access request;
   reconnecting the client to another one of the plurality of virtualized storage nodes, by moving the virtual drive to another virtualized storage node that contains another virtual cartridge to continue accessing remaining data in the data access request; and
   directing new data write requests to a deduplication store already having duplicate data that matches the new data based on initial hash signatures.

2. The method of claim 1, further comprising signaling the client that the connection to one of the plurality of virtualized storage nodes is busy while reconnecting the client to another one of the plurality of virtualized storage nodes.

3. The method of claim 1, further comprising interrupting a connection with the client within a timeout window of a data access application.

4. The method of claim 3, wherein interrupting the connection with the client is transparent to the client.

5. The method of claim 3, wherein the connection with the client is restored before a data access application registers an error in data access operations.

6. The method of claim 1, further comprising reducing backend network traffic between the plurality of virtualized storage nodes.

7. The method of claim 1, further comprising balancing bandwidth for the plurality of virtualized storage nodes.

8. The method of claim 1, further comprising moving data among the plurality of virtualized storage nodes on a backend network during times of low backup operation traffic.

9. A system for load balancing data access in virtualized storage nodes, the system embodied at least in part in program code stored on a non-transitory computer readable storage and executable by a processor and comprising:
   a processor;
   an interface between the virtualized storage nodes and a client, the interface configured to receive data access requests from the client for data on the plurality of the virtualized storage nodes; and
   a connection manager operatively associated with the interface, the connection manager configured to connect the client to one of the plurality of virtualized storage nodes by moving a virtual drive to one of a plurality of virtualized storage nodes that contain a virtual cartridge having portions of data for a data access request, and then reconnect the client to another one of the plurality of virtualized storage nodes by moving the virtual drive to another virtualized storage node that contains another virtual cartridge to provide access to data in the data access request, the data being stored across multiple of the plurality of virtualized storage nodes, and the connection manager directing new data write requests to a deduplication store already having duplicate data that matches the new data based on initial hash signatures.

10. The system of claim 9, wherein the interface signals the client that the connection to one of the plurality of virtualized storage nodes is busy when the connection manager reconnects the client to another one of the plurality of virtualized storage nodes.

11. The system of claim 9, wherein the connection manager reconnects the client to another one of the plurality of virtualized storage nodes within a timeout window of a data access application executing for the client.

12. The system of claim 9, wherein the connection manager reconnects the client to another one of the plurality of virtualized storage nodes transparently to the client.

13. The system of claim 9, wherein the connection manager reconnects the client to another one of the plurality of virtualized storage nodes before a data access application registers an error in data access operations.

14. A data access system embodied at least in part in program code stored on a non-transitory computer readable storage and executable by a processor and comprising:
   a processor;
   an interface for a plurality of virtualized storage nodes, the interface configured to receive data access requests from a client for data on the plurality of the virtualized storage nodes; and
   a connection manager operatively associated with the interface, the connection manager configured to connect the client to one of the plurality of virtualized storage nodes by moving a virtual drive to one of a plurality of virtualized storage nodes that contain a virtual cartridge having portions of the data for the data access request, and then reconnect the client to another one of the plurality of virtualized storage nodes by moving the virtual drive to another virtualized storage node that contains another virtual cartridge to provide access to data stored across the plurality of virtualized storage nodes, and the connection manager directing new data write requests to a deduplication store already having duplicate data that matches the new data based on initial hash signatures.

15. The system of claim 14, wherein:
   the interface signals the client that one of the plurality of virtualized storage nodes is busy while the connection manager reconnects the client to another one of the plurality of virtualized storage nodes; and
   the connection manager reconnects the client to another one of the plurality of virtualized storage nodes within a timeout window of a data access application executing for the client before the data access application registers an error so that the connection/reconnection is transparent to the client.

16. The method of claim 1, further comprising a virtual drive moving to different nodes as a read progresses through a virtual cartridge stored across the plurality of the virtualized storage nodes.

17. The method of claim 1, further comprising writing an initial portion of the new data to a wrong node, and locating the appropriate deduplication store based on the initial portion of the data written to the wrong node, and then moving the initial portion of the data written to the wrong node to a correct node.

18. The method of claim 1, further comprising presenting each of the plurality of the virtualized storage nodes as a unique port to a backup application executing on the client.

19. The method of claim 18, further comprising disabling a physical port of a virtual drive while enabling presentation of the virtual drive to a backup application executing on the client from a different physical port on a different one of the plurality of the virtualized storage nodes.

20. The method of claim 1, wherein pieces of a virtual cartridge are contained in different deduplication stores based on references to other duplicate data in other virtual cartridges of the virtualized storage nodes.

* * * * *